US008472037B2

(12) United States Patent
Murayama

(10) Patent No.: US 8,472,037 B2
(45) Date of Patent: Jun. 25, 2013

(54) DOCUMENTATION APPARATUS AND TAPE PRINTING APPARATUS

(75) Inventor: Noriaki Murayama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 618 days.

(21) Appl. No.: 12/488,081

(22) Filed: Jun. 19, 2009

(65) Prior Publication Data

US 2010/0014904 A1 Jan. 21, 2010

(30) Foreign Application Priority Data

Jul. 15, 2008 (JP) ................................ 2008-183376

(51) Int. Cl.
*G06K 15/00* (2006.01)
*G06F 3/12* (2006.01)

(52) U.S. Cl.
USPC ....... 358/1.13; 358/1.14; 358/1.15; 358/1.16; 358/1.18

(58) Field of Classification Search
None
See application file for complete search history.

(56) References Cited

U.S. PATENT DOCUMENTS

| | | | | |
|---|---|---|---|---|
| 6,532,078 | B2 | 3/2003 | Hayama | |
| 2003/0219300 | A1 * | 11/2003 | Kurashina | 400/615.2 |

FOREIGN PATENT DOCUMENTS

| | | | |
|---|---|---|---|
| JP | 11157137 | A | 6/1999 |
| JP | 2004-025581 | | 1/2004 |

OTHER PUBLICATIONS

Hosokawa Takeshi; "Tape Printer . . . Storage Medium"; JP Pub Date Jan. 2004; Machine Translation in English of JP Pub 2004025581.*
Machine Translation of JP Pub 2004025581 to Hosokawa Takeshi.*

* cited by examiner

*Primary Examiner* — Benny Q Tieu
*Assistant Examiner* — Haris Sabah
(74) *Attorney, Agent, or Firm* — DLA Piper LLP (US)

(57) ABSTRACT

A documentation apparatus includes: a selection unit which selects one function item from plural function items associated with documentation and selects one choice from plural selects included in the selected function item; a memory unit which stores the function item selected last and a non-selection candidate other than the selection candidate selected in the function item; and a function execution unit which performs function corresponding to the stored non-selection candidate by predetermined operation of the selection unit.

4 Claims, 5 Drawing Sheets

DOCUMENTATION APPARATUS AND TAPE PRINTING APPARATUS

The entire disclosure of Japanese Patent Application No. 2008-183376, filed Jul. 15, 2008, is expressly incorporated by reference herein.

BACKGROUND

1. Technical Field

The present invention relates to a documentation apparatus and a tape printing apparatus having a plurality of functions associated with documentation.

2. Related Art

A tape printing apparatus capable of establishing function items such as format and character style as printing target data (character string, image and the like) is known. This type of tape printing apparatus provides a plurality of function items, each of which is hierarchical and contains a plurality of selection candidate. A user of the tape printing apparatus selects appropriate selection candidate from the upper hierarchy to the lower hierarchy included in the respective function items through predetermined operation (such as key operation) to give desired printing attributes to the target character strings (for example, see JP-A-2004-25581).

According to the tape printing apparatus described above which hierarchical respective function items, however, the number of hierarchical increases by multiplication of choices included in each of the function items. In this case, the user needs to perform a plurality of operations for selecting choice in the lower hierarchy, which requires labor and time. This type of tape printing apparatus generally has a small display screen, and it is therefore difficult to select choice in the desired function item while checking preview of the target character string condition. Thus, when the result of the selected choice is different from that of the user's intention, the user needs to perform operation for calling the corresponding function item again and select a choice other than the choice previously selected. In this case, operation becomes complicated and labor increases.

SUMMARY

It is an advantage of some aspects of the invention to provide a documentation apparatus and a tape printing apparatus capable of execution function corresponding to a choice other than a choice selected in an arbitrary function item by easy operation.

A documentation apparatus according to a first aspect of the invention includes: a selection unit which selects one function item from plural function items associated with documentation and selects one choice from plural choices included in the selected function item; a memory unit which stores the function item selected last and a non-selection candidate as a choice other than the choice selected in the function item; and a function execution unit which performs function corresponding to the stored non-selection candidate by predetermined operation of the selection unit.

According to this structure, the documentation apparatus stores the function item selected last and the non-selection candidate other than the selection candidate selected for the corresponding function item contained in the plural function items associated with documentation, and performs function corresponding to the non-selection candidate by the predetermined operation of the user.

Thus, when the user desires result different from the result of the function corresponding to the selection candidate selected last by the user, the user can execute function corresponding to other selection candidate (choice other than the choice currently selected) by easy operation (such as one action). Accordingly, usability of the documentation apparatus improves without increasing labor. Particularly when the function item has a multiple hierarchy structure, a complicated operation for execution predetermined action (such as pressing predetermined key) plural times is not required to select target selection candidate located in the lower hierarchy unlike the method of related art. Thus, the usability further improves.

The term "predetermined operation" in the appended claims refers to particular operation determined in advance, and does not change contents of operation depending on the non-selection candidate for execution function. The function item is used to set paragraph style (such as vertical and horizontal transcription and character size) and type style (such as Ming-cho type and Gothic type) for characters and character strings inputted by the user.

A documentation apparatus according to a second aspect of the invention includes: a selection unit which selects one function item from plural function items associated with documentation and selects one choice from plural selects included in the selected function item; a memory unit which stores the function item selected last and the selection candidate selected in the function item; and a function execution unit which performs function corresponding to a non-selection candidate other than the stored it by predetermined operation of the selection unit.

According to this structure, the documentation apparatus stores the function item selected last and the selection candidate selected for the corresponding function item contained in the plural function items associated with documentation, and performs function corresponding to a selection candidate other than the stored selection candidate (non-selection candidate) by the predetermined operation of the user. Thus, when the user desires result different from the result of the function corresponding to the selection candidate selected last by the user, the user can execute function corresponding to other selection candidate (choice other than the choice currently selected) by easy operation (such as one action). Accordingly, usability of the documentation apparatus improves without increasing labor.

It is preferable that the documentation apparatus further includes a display unit which displays plural selects in the selected function item. The display unit cyclically displays the plural selection candidate. The non-selection candidate is a choice located next in the cyclic direction.

According to this structure, the plural selects in the respective function items are cyclically displayed, and the next choice in the cyclic direction becomes the non-selection candidate. That is, the selection candidate located one choice after (or one choice before) the selection candidate selected last by the user becomes the non-selection candidate.

When plural selects are present, there is a general tendency that selections having similar results (selection results) are disposed close to one another. When the actual result of the selection candidate selected by the user is different from the result desired by the user, the user often requires result close (similar) to the actual result. Considering these facts, it is effective that the non-selection candidate is determined as the selection candidate located one choice after (or before) the selection candidate selected last by the user.

It is preferable that the number of times of selection is set as weight for each of the selection candidate, and that the non-selection candidate is determined according to the weight.

According to this structure, the non-selection candidate is determined based on weights set for respective selection candidate according to the number of times of selection. In this case, the user can easily execute functions corresponding to the selection candidate having high selection frequency, that is, the selection candidate frequently used by the user. Thus, the usability further improves.

A tape printing apparatus according to a third aspect of the invention includes respective units included in the documentation apparatus described above.

According to this structure, the tape printing apparatus can execute function corresponding to a selection candidate other than the selection candidate selected last by the user (non-selection candidate) by predetermined one action of the user.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment according to the invention is hereinafter described with reference to the attached drawings. In this embodiment, a tape printing apparatus which produces labels by printing on tape medium is discussed as an example of documentation apparatus.

Figure 1:
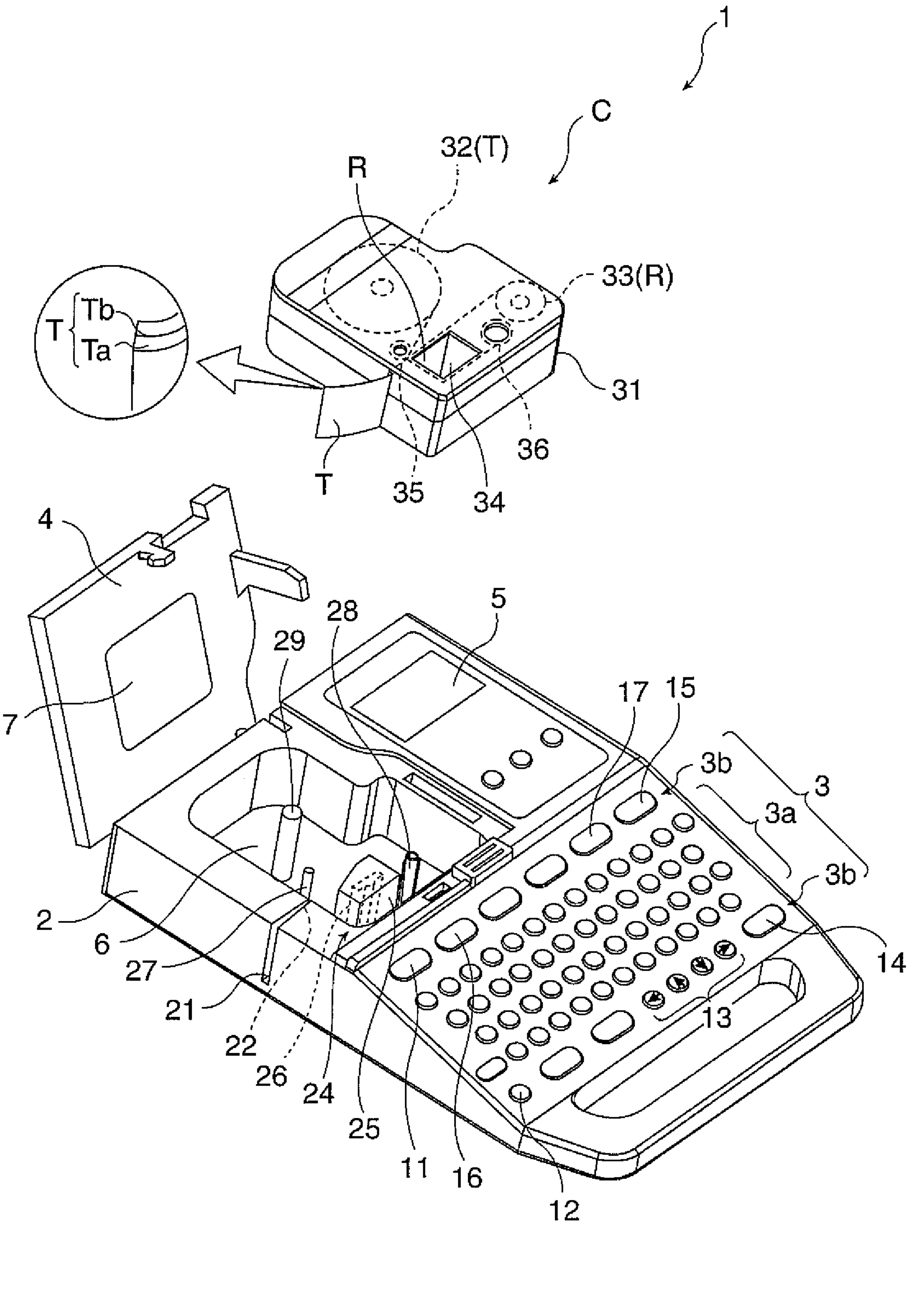
FIG. 1 is a perspective view illustrating external appearance of a tape printing apparatus with its cover opened according to an embodiment of the invention.

FIG. 1 is a perspective view illustrating external appearance of a tape printing apparatus 1 with its open/close cover 4 opened according to this embodiment. As illustrated in FIG. 1, the tape printing apparatus 1 includes a apparatus case 2 constituting the external casing, a keyboard 3 (selection unit) having various types of input keys on the front upper surface of the apparatus case 2, the open/close cover 4 on the left part of the rear upper surface, and a display screen 5 (display unit) on the right part of the rear upper surface. The tape printing apparatus 1 further has a cartridge mounting section 6 concaved inside the open/close cover 4 such that a tape cartridge C can be attached to the cartridge mounting section 6. In this structure, the tape cartridge C is detachably attached to the cartridge mounting section 6 with the open/close cover 4 opened. The tape printing apparatus 1 also has a window 7 through which attachment/detachment of the tape cartridge C can be visually recognized with the open/close cover 4 closed.

The keyboard 3 has a character key group 3*a* and a function key group 3*b* for specifying various operation modes and the like. The character key group 3*a* has a full-key constitution based on JIS (Japanese Industrial Standards) arrangement, and has a similar structure as that of a typical word processor and the like including shift key for reducing the number of keys to be operated and other keys. The function key group 3*b* has a "print" key 11 for commanding printing, a "power source", key 12 for determining ON/OFF of power source (supply and cut off of power source), cursor keys for shifting cursor and scrolling ("↓", "↑", "←", "→") 13, a "select" key 14 for selecting and determining selection candidate, a "cancel" key 15 for canceling selected selection candidate, and others.

The function key group 3*b* has a "function menu" key 16 for selecting various function items including paragraph style (such as vertical and horizontal transcription and character size), type style (such as Ming-cho type and Gothic type), and character mode (such as decorated character and character interval), and a "direct" key 17 for executing function corresponding to selected selection candidate in arbitrary function item. The details of the function key group 3*b* will be described later.

These keys may be inputted through keys exclusively provided for each input, or through a smaller number of keys used in combination with shift key or the like in a manner similar to a method of a typical keyboard. The term "predetermined operation" in the appended claims includes not only operation of pressing one key (such as pressing only "direct" key 17) but also operation of simultaneously pressing shift key having similar function as that of the corresponding key and an existing key.

The display screen 5 is constituted by a liquid crystal display. The display screen 5 is used when the user creates and edits printing data such as text data and image data by inputting desired data (such as text and image) through the keyboard 3, or visually check (confirm) results of the printing data. The display screen 5 also cyclically displays plural function items or plural selection candidate according to predetermined operation by the user. The details will be described later.

A tape ejecting slot 21 is formed on the left side of the apparatus case 2 such that the cartridge mounting section 6 can communicate with the outside through the tape ejecting slot 21. A tape cutter 22 faces the tape ejecting slot 21 to cut printing tape T fed to the tape cutter 22. A predetermined length of the printing tape T after printing is shifted out of the case 2 through the tape ejecting slot 21 and cut by the tape cutter 22 while tape feeding is temporarily stopped so as to produce a label strip. In cutting process, actuation of a cutter motor 23 (see FIG. 3) can be set based on choice whether automatic cutting is executed or not.

The cartridge mounting section 6 includes a head unit 24 which accommodates a thermal type printing head 26 within a head cover 25, a platen drive shaft 27 opposed to the printing head 26, a take-up drive shaft 28 for take-up ink ribbon R described later, and a positioning boss 29 for positioning a tape reel 32 described later. A tape feed motor 30 (see FIG. 3) for rotating the platen drive shaft 27 and the take-up drive shaft 28 is contained below the cartridge mounting section 6.

The tape cartridge C includes a tape reel 32 disposed at the upper center inside a cartridge case 31 and a ribbon reel 33 disposed on the lower right part inside the cartridge case 31. The printing tape T having a constant width (approximately in the range from 4 mm to 48 mm) is wound around the tape cartridge 32. The ink ribbon R is wound around the ribbon reel 33. The printing tape T and the ink ribbon R have the same width. A through hole 34 into which the head cover 25 covering the head unit 24 is inserted is formed on the lower left side of the tape reel 32. A platen roller 35 which rotates by engagement with the platen drive shaft 27 is provided at the position corresponds to the overlapping area of the printing tape T and the ink ribbon R under the condition in which the head unit 24 is inserted into the through hole 34. A ribbon take-up reel 36 is disposed in the vicinity of the ribbon reel 33 such that the ink ribbon R pulled out from the ribbon reel 33 can be wound around the ribbon take-up reel 36 after traveling around the head cover 25.

When the tape cartridge C is attached to the cartridge mounting section 6, the head cover 25 is inserted into the through hole 34. Also, the positioning boss 29 is inserted into the center hole of the tape reel 32, and the take-up drive shaft 28 is inserted into the center hole of the ribbon take-up reel 36. In this condition, the printing head 26 contacts the platen roller 35 with the printing tape T and the ink ribbon R positioned between the printing head 26 and the platen roller 35 such that printing can be prepared. Then, the user inputs desired text (character such as letter, numeral, symbol, and easy figure) or image through the keyboard 3 while checking the edition result on the display screen 5, and commands printing. In response to the command, the tape printing apparatus 1 pulls the printing tape T out of the tape cartridge C by using the tape feed motor 30 and generates heat by using a selected heat element of the printing head 26 to perform desired printing on the printing tape T. The printing tape T is discharged through the tape output 21 after printing. When printing is finished, the tape feed motor 30 shifts the printing tape T to the position corresponding to the tape length including margin and stops tape feeding. (Then, the process proceeds to cutting process).

The printing tape T is constituted by recording tape Ta having adhesive layer on the back surface and a release tape Tb affixed to the recording tape Ta by the adhesive layer. The printing tape T is wound in a roll shape and accommodated within the cartridge case 31 with the recording tape Ta positioned outside and the release tape Tb positioned inside. Plural types of the printing tape T having different tape types (such as tape width, tape base color, base pattern, material (feel of material)) are prepared, and one of these types as the printing tape T and the ink ribbon R are accommodated in each cartridge case 31. A plurality of holes (not shown) for specifying the type of the tape cartridge C are formed on the back surface of the cartridge case 31. A plurality of tape discriminating sensors 37 (such as micro switches) for detecting these holes (see FIG. 3) are provided on the cartridge mounting section 6 at positions corresponding to the holes to determine the tape type by detecting the condition of the plural holes using the tape discriminating sensors 37.

Figure 2:
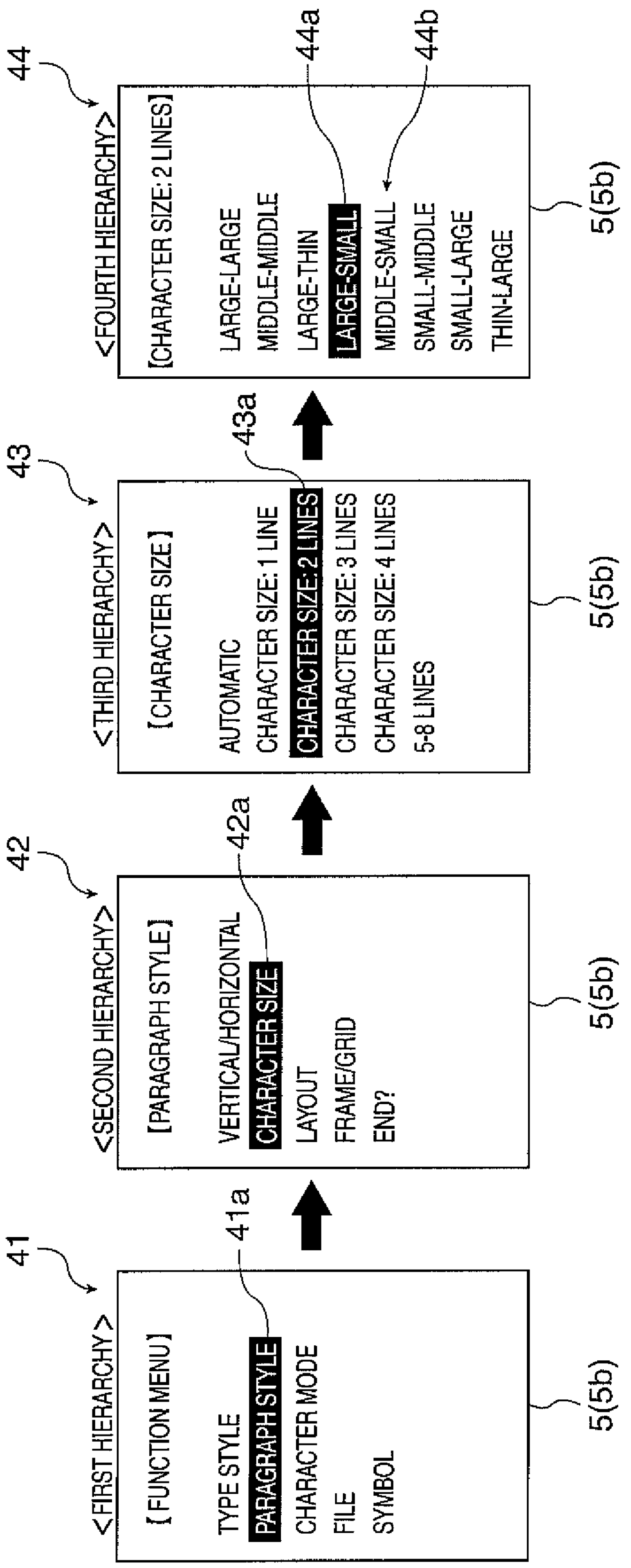
FIG. 2 shows function items and selection candidate for setting character size.

The function items and selection candidate are now discussed with reference to FIG. 2. FIG. 2 shows respective function items and selection candidate for setting (changing) character size. Each of the function items has hierarchy structure, and the function item group of a first hierarchy 41 is displayed on the display screen 5 by pushing the "function menu" key 16. The function item group of the first hierarchy 41 is constituted by the function item groups or selection candidate groups of the lower hierarchical 42, 43 and 44 belonging to the corresponding function items of the first hierarchy 41. The user selects selection candidate in the desired function items from the upper hierarchy to the lower hierarchy of these hierarchical by execution predetermined operation (pressing cursor keys 13 or "select" key 14). The respective function item groups and selection candidate groups (including the hierarchical 42, 43 and 44 lower than the first hierarchy 41) are cyclically displayed by operating the cursor keys 13.

The term "selection candidate" in the appended claims refers to selection candidate belonging to the lowest hierarchy (final hierarchy) in each function item, and the term "function item" refers to selection candidate belonging to hierarchical other than the lowest hierarchy. For example, in case of setting (changing) character size as shown in FIG. 2, the selection candidate in the first hierarchy 41, the second hierarchy 42, and the third hierarchy 43 ("paragraph style 41*a*", "character size 42*a*", and "character size: 2 lines 43*a*") are "function items", and the selection candidate in the fourth hierarchy 44 ("large-small" 44*a*) is "selection candidate".

Figure 3:
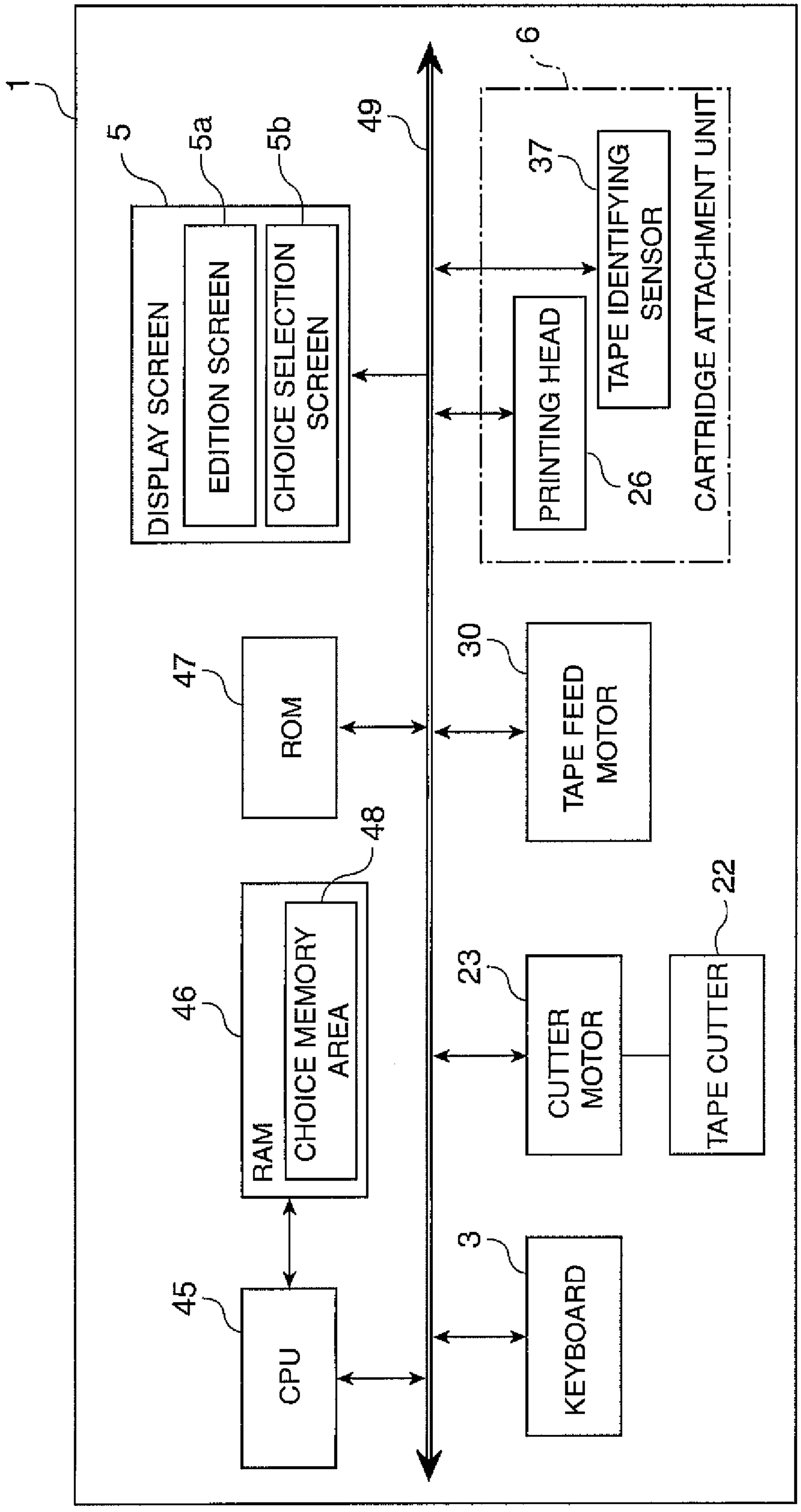
FIG. 3 is a control block diagram of the tape printing apparatus according to the embodiment of the invention.

The control structure of the tape printing apparatus 1 is now explained with reference to a control block diagram shown in FIG. 3. The tape printing apparatus 1 includes a CPU (central processing unit: function execution unit) 45 as a central processing device, a RAM (random access memory) 46, a ROM (read only memory) 47, the display screen 5, the keyboard 3, the cutter motor 23, the tape cutter 22, the tape feed motor 30, the printing head 26, and the tape discriminating sensors 37. The CPU 45 is connected with the ROM 47, the display screen 5, the keyboard 3, the cutter motor 23, the tape feed motor 30, the printing head 26, and the tape discriminating sensors 37 via a bus 49.

The ROM 47 stores control program and control data used for execution various controls by using the CPU 45. The RAM 46 is directly connected with the CPU 45 and used as a work area when the CPU 45 performs various controls.

The RAM 46 has a selection candidate memory area 48 (memory unit) to store function item selected last by the user (hereinafter referred to as "final function item"), and selection candidate other than selection candidate selected in the final function item (hereinafter referred to as "non-selection candidate" in the selection candidate memory area 48.

According to this embodiment, the non-selection candidate corresponds to the selection candidate subsequent to the selection candidate selected last in the cyclic direction (direction from the upper selection candidate to the lower selection candidate on the display screen 5 in this example). That is, the non-selection candidate in this embodiment corresponds to the selection candidate located one selection candidate lower from the selection candidate selected last. For example, when the selection candidate selected last is the selection candidate "large-small 44*a*" selected in the fourth hierarchy 44 as shown in FIG. 2, the non-selection candidate becomes "middle-small 44*b*". When the selection candidate selected last is the selection candidate located lowest on the display screen 5, the non-selection candidate becomes the selection candidate located uppermost on the display screen 5 due to cyclic display.

The display screen 5 has an edition screen 5*a* and a selection candidate selection screen 5*b*. The edition screen 5*a* displays results of text or the like inputted or edited by the user. The selection candidate selection screen 5*b* displays plural function items and plural selection candidate for each function item as shown in FIG. 2.

The keyboard 3 functions as data input unit for inputting various data, and as specifying and setting unit for providing various specifications and settings. The keyboard 3 has the "function menu" key 16 and the "direct" key 17 included in the function key group 3*b* as discussed above. The final function item and the non-selection candidate stored in the selection candidate memory area 48 are allocated to (or established for) the "direct" key 17.

The cutter motor 23 is connected with the tape cutter 22 and functions as cutting unit. The tape feed motor 30 and the printing head 26 functions as printing unit for printing on the printing tape T.

According to this structure, the CPU 45 stores the function item selected last by the user (final function item) and the selection candidate subsequent to the selection candidate selected in the corresponding function item (non-selection candidate). When the "direct" key 17 is pressed, the CPU 45 performs function corresponding to the final function item and the non-selection candidate thus stored. That is, the function corresponding to the selection candidate subsequent to the selection candidate previously selected is performed by using the "direct" key 17.

When plural selection candidate are present, there is a general tendency that selections having similar results (selection results) are disposed close to one another. When the actual result of the selection candidate selected by the user is different from the result desired by the user, the user often requires result close (similar) to the actual result. Considering these facts, it is effective that the non-selection candidate is determined as the selection candidate located one selection candidate lower (after) from the selection candidate selected last by the user.

Figure 4:
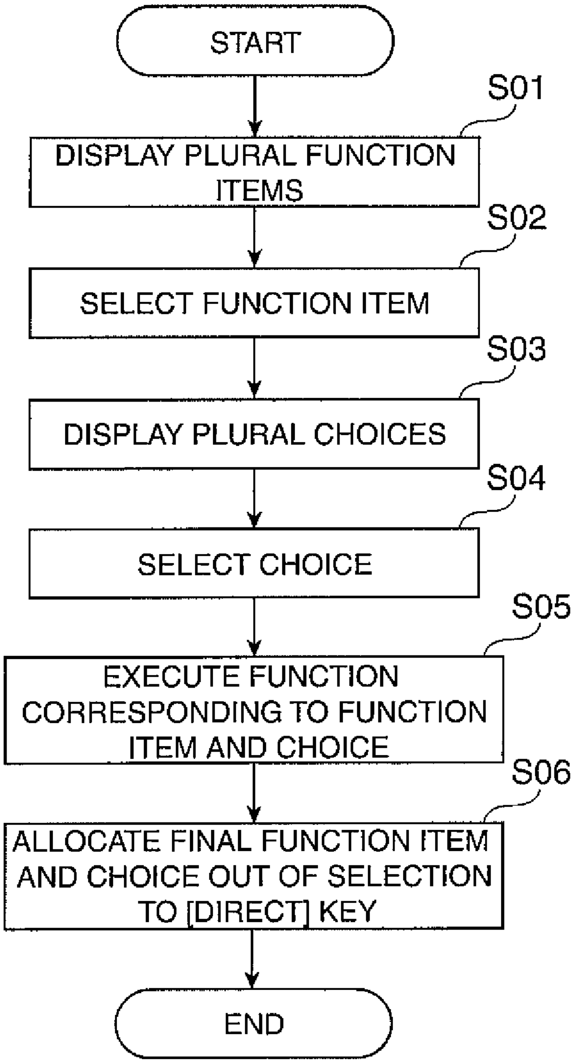
FIG. 4 shows a process for setting a "direct" key.

The process for setting the "direct" key 17 is now explained with reference to a flowchart shown in FIG. 4. When the "function menu" key 16 is pressed by the user, the tape printing apparatus 1 initially displays plural function items on the display screen 5 (5*b*) (S01). Then, the tape printing apparatus 1 selects one function item from the plural function items according to the operation of the user (S02), and displays plural selection candidate in the selected function item (S03). The tape printing apparatus 1 further selects one selection candidate from the plural selection candidate according to the operation of the user (S04), and performs function corresponding to the selected function item and selected selection candidate to reflect the function on the data (such as text) on the display screens (S05). Then, the tape printing apparatus 1 stores the selected function item as the final function item and the selection candidate subsequent to the selected selection candidate (located one selection candidate lower) as the non-selection candidate in the selection candidate memory area 48. That is, the tape printing apparatus 1 allocates the final function item and the non-selection candidate to the "direct key" 17 (S06). When the selected selection candidate is the selection candidate located lowest in the corresponding function item, the non-selection candidate becomes the selection candidate located uppermost in the corresponding to the function item.

Figure 5:
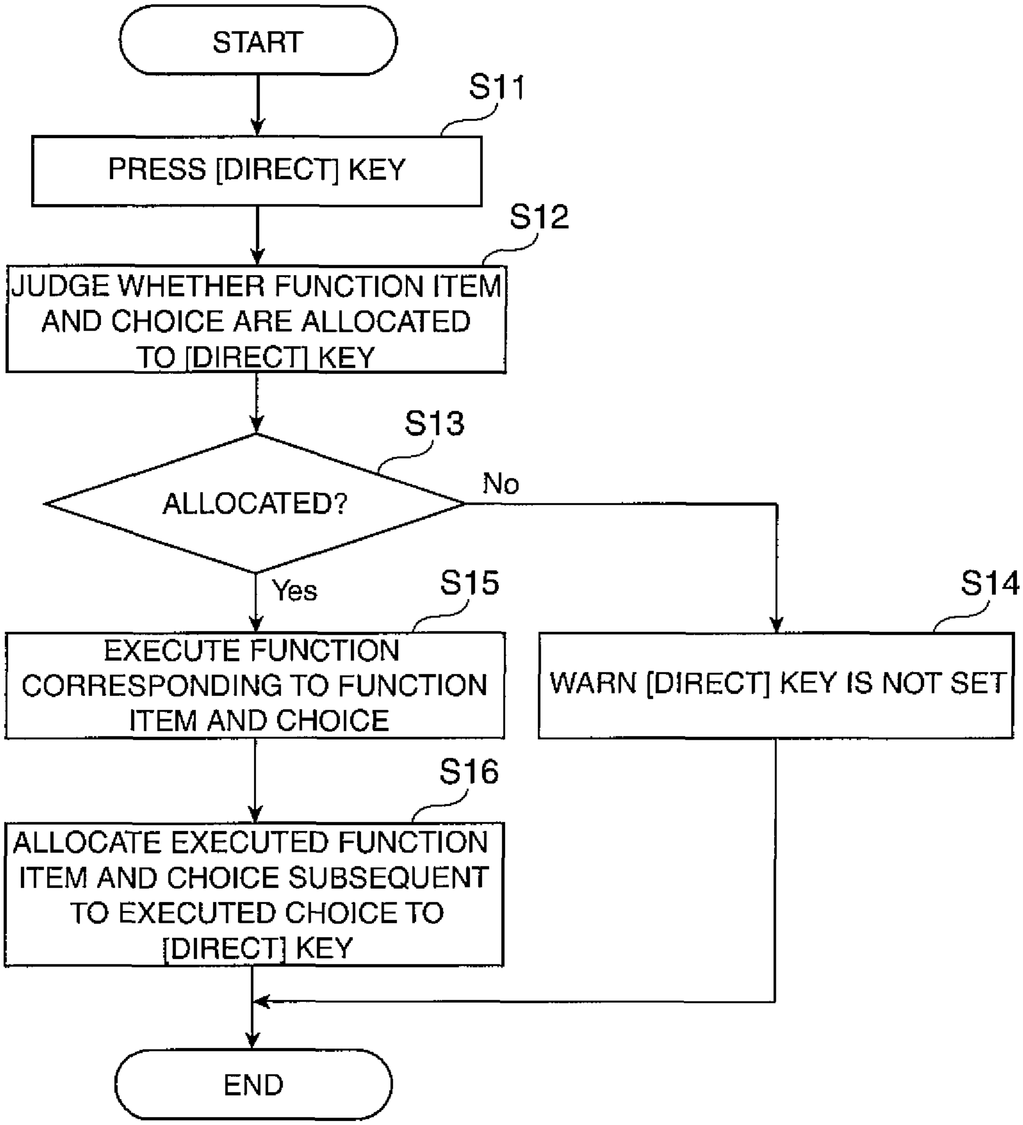
FIG. 5 shows a process for execution function by press of the "direct" key.

Next, the process for execution function by press of the "direct" key 17 is explained with reference to a flowchart shown in FIG. 5. When the "direct" key 17 is pressed by the user (S11), the tape printing apparatus 1 initially judges whether the function item and the selection candidate have been allocated to the "direct" key 17 (that is, the final function item and non-selection candidate have been stored in the selection candidate memory area 48) (S12). When it is determined that the function item and the selection candidate have not been allocated to the "direct" key 17 (S13: NO), the tape printing apparatus 1 displays a warning notifying that the "direct" key 17 has not been set on the display screen 5 (S14).

When it is determined that the function item and the selection candidate have been allocated to the "direct" key 17 (S13: YES) the tape printing apparatus 1 performs function corresponding to the stored function item and selection candidate, and reflects the function on the data (such as text) on the display screen 5 (S15). Then, the tape printing apparatus 1 stores the performed function item and the selection candidate subsequent to the performed selection candidate in the selection candidate memory area 48. That is, the tape printing apparatus 1 allocates the function item performed by the press of the "direct" key 17 and the selection candidate subsequent to the selection candidate performed by the press of the "direct" key 17 to the "direct" key 17 (S16).

According to this embodiment, the tape printing apparatus 1 stores the function item selected last and the non-selection candidate as the selection candidate subsequent to the selection candidate selected for the corresponding function item contained in the plural function items associated with documentation, and performs function corresponding to the non-selection candidate by the press of the "direct" key 17 of the user. Thus, when the user desires result different from the result of the function corresponding to the selection candidate selected last by the user, the user can perform function corresponding to the next selection candidate (selection candidate subsequent to the selection candidate currently selected) by easy operation. Accordingly, usability of the tape printing apparatus 1 improves. Particularly when the function item has a multiple hierarchy structure, a complicated operation for execution predetermined action (such as pressing predetermined key) plural times is not required to select target selection candidate located in the lower hierarchy unlike the method of related art. Thus, the usability further improves.

According to this embodiment, the non-selection candidate corresponds to the selection candidate located next to the selection candidate selected last in the cyclic direction (selection candidate located one selection candidate lower from the selection candidate selected last). However, the non-selection candidate may be any selection candidate other than the selection candidate selected last.

For example, the non-selection candidate may be determined based on weights set for respective selection candidate according to the number of times of selection. In this case, the user can easily execute functions corresponding to the selection candidate having high selection frequency, that is, the selection candidate frequently used by the user. Thus, the usability further improves.

The cyclic direction of the selection candidate may be "direction from the lower selection candidate to the upper selection candidate on the display screen 5", and the non-selection candidate may be the selection candidate located one selection candidate upper from the selection candidate selected last. In this case, when the selection candidate selected last is located at the uppermost position on the display screen 5, the non-selection candidate becomes the selection candidate located at the lowest position on the display screen 5.

While plural selection candidate are present in each function item in this embodiment, only one selection candidate may be included in each function item. In this case, the selection candidate selected last may be stored in the selection candidate memory area 48 as the non-selection candidate to perform the same function as the previous function by press of the "direct" key 17. Alternatively, the contents of the selection candidate memory area 48 may be cleared to produce such a condition where the "direct" key 17 is not yet set. When only one selection candidate exists in the function item selected last, the screen located one screen before the screen where the one selection candidate has been selected (that is, screen for selecting the corresponding function item) may be displayed by press of the "direct" key 17.

When the function item selected last and the selection candidate selected for the corresponding function item are stored in the selection candidate memory area 48, function corresponding to selection candidate other than the selection candidate stored in the selection candidate memory area 48 may be performed by operation of the "direct" key 17. In this case, the "selection candidate other than the selection candidate stored in the selection candidate memory area 48" refers to the "non-selection candidate" similarly to this embodiment. The tape printing apparatus 1 determines the non-selection candidate under predetermined rule (rule such as determining the selection candidate next to the selected selection candidate in the cyclic direction as the non-selection candidate) by the press of the "direct" key 17 to perform function corresponding to this non-selection candidate.

According to this embodiment, the final function item and the non-selection candidate are stored in the selection candidate memory area 48 (RAM 46). However, the final function item and the non-selection candidate may be stored as non-volatile data in a non-volatile storage medium (such as flash ROM) provided on the tape printing apparatus 1.

The invention is not limited to the embodiment described and depicted herein. Obviously, the apparatus structure and respective steps of the processes included in the tape printing apparatus 1 may be appropriately modified without departing from the scope and spirit of the invention.

What is claimed is:

1. A documentation apparatus comprising:

a selection unit which selects one function item from plural function items associated with documentation and selects one selection candidate from plural candidates included in the selected function item;

a memory unit which stores the function item selected last and a non-selection candidate other than the selection candidate selected in the function item; and a function execution unit which performs a function corresponding to the selection candidates selected by the selection unit, and a display unit which displays plural selection candidates in the selected function item, wherein the selection unit selects directly the stored non-selection candidate in the stored function item by a predetermined operation of the selection unit, the predetermined operation is operated after performing the function corresponding to the selection candidate selected in the function item, the display unit cyclically displays the selection candidate, the non-selection candidate is a choice located next in the cyclic direction, the number of times of selection candidate is set as weight for each of the choices, and the non-selection candidate is determined according to the weight.

2. A tape printing apparatus comprising respective units included in the documentation apparatus according to claim 1.

3. A documentation apparatus comprising:

a selection unit which selects one function item from plural function items associated with documentation and selects one selection candidate from plural candidates included in the selected function item;

a memory unit which stores the function item selected last and the selection candidate in the function item, wherein the selection candidate is selected in the function item; and a function execution unit which performs a function corresponding to the selection candidates selected by the selection unit, and a display unit which displays plural selection candidates in the selected function item, wherein the selection unit selects directly stored a non-selection candidate other than the stored selection candidate in the stored function item by a predetermined operation of the selection unit, the predetermined operation is operated after performing the function corresponding to the selection candidate selected in the function item, the display unit cyclically displays the selection candidate, and the non-selection candidate is a choice located next in the cyclic direction, number of times of selection candidate is set as weight for each of the choices, and the non-selection candidate is determined according to the weight.

4. A control method of a documentation apparatus comprising:

selecting one function item from plural function items associated with documentation;

selecting one selection candidate from plural candidates included in the selected function item;

performing a function corresponding to the selection candidates;

selecting directly stored a non-selection candidate other than the selection candidate in the function item, by a predetermined operation which is operated after performing the function corresponding to the selection candidate selected in the function item, and displaying the selection candidate in the selected function item, wherein the selection candidate are cyclically displayed, the non-selection candidate is a choice located next in the cyclic direction, number of times of selection candidate is set as weight for each of the choices, and the non-selection candidate is determined according to the weight.

* * * * *